US012778113B2

(12) United States Patent
Denmon

(10) Patent No.: US 12,778,113 B2
(45) Date of Patent: Nov. 3, 2026

(54) MOTORIZED FLAPPING DECOY APPARATUS WITH SPLASHER

(71) Applicant: Huntwise, Inc., Monroe, LA (US)

(72) Inventor: Terry Denmon, Monroe, LA (US)

(73) Assignee: Huntwise, Inc., Monroe, LA (US)

( * ) Notice: Subject to any disclaimer, the term of this patent is extended or adjusted under 35 U.S.C. 154(b) by 0 days.

(21) Appl. No.: 18/905,281

(22) Filed: Oct. 3, 2024

(65) Prior Publication Data

US 2025/0113819 A1 Apr. 10, 2025

Related U.S. Application Data

(60) Provisional application No. 63/542,563, filed on Oct. 5, 2023.

(51) Int. Cl.
*A01M 31/06* (2006.01)

(52) U.S. Cl.
CPC .................................. *A01M 31/06* (2013.01)

(58) Field of Classification Search
CPC ..................................................... A01M 31/06
See application file for complete search history.

(56) References Cited

U.S. PATENT DOCUMENTS 6,321,480 B1 * 11/2001 Solomon ............... A01M 31/06 43/3
6,508,028 B1 * 1/2003 Crowe .................. A01M 31/06 43/3
7,043,865 B1 * 5/2006 Crowe .................. A01M 31/06 43/3
7,788,838 B2 * 9/2010 Anthony ............... A01M 31/06 43/2
8,188,691 B1 * 5/2012 Twohig ................. A01M 31/06 43/2
9,101,129 B2 * 8/2015 Brooks ................. A01M 31/06
10,517,291 B2 * 12/2019 Denmon ............... A01M 31/06
10,638,747 B2 * 5/2020 Noe ....................... G06F 13/385
10,856,544 B2 * 12/2020 Noe ..................... G06F 13/4077
10,932,462 B2 * 3/2021 Denmon ............... A01M 31/06
11,758,903 B2 * 9/2023 Noe ....................... G06F 13/385 177/1
12,022,821 B2 * 7/2024 Denmon ............... A01M 31/06
12,041,929 B2 * 7/2024 Parker ................... A01M 31/06
12,052,983 B2 * 8/2024 Denmon ............... A01M 31/06
12,239,122 B2 * 3/2025 Denmon ............... A01M 31/06
2004/0211106 A1 * 10/2004 Solomon ............... A01M 31/06 43/3
2007/0006514 A1 * 1/2007 Fiore ..................... A01M 31/06 43/2
2008/0028664 A1 * 2/2008 Anthony ............... A01M 31/06 43/3
2017/0055521 A1 * 3/2017 Denmon ............ G02B 26/0816

(Continued)

*Primary Examiner* — Jessica B Wong
(74) *Attorney, Agent, or Firm* — Kean Miller LLP; Robert Devin Ricci; Stephen M. Kepper

(57) ABSTRACT

A decoy apparatus for use in a water environment comprising a motor operatively connected to a splasher to cause a water effect when in operation, said motor and splasher being connected to a pole member such that the motor is located above the surface of a body of water and said splasher is capable of contacting said water when in operation. In one or more embodiments, the decoy apparatus may further comprise a decoy body substantially in the shape of an avian animal.

17 Claims, 17 Drawing Sheets

(56) References Cited

U.S. PATENT DOCUMENTS

| | | | | |
|---|---|---|---|---|
| 2018/0192638 | A1* | 7/2018 | Denmon ............... | A01M 31/06 |
| 2020/0113175 | A1* | 4/2020 | Denmon ............... | A01M 31/06 |
| 2021/0176983 | A1* | 6/2021 | Denmon ............... | A01M 31/06 |
| 2023/0292740 | A1* | 9/2023 | Parker ................... | A01M 31/06<br>43/3 |
| 2024/0315236 | A1* | 9/2024 | Denmon ............... | A01M 31/06 |
| 2024/0373837 | A1* | 11/2024 | Parker ................. | A01M 31/004 |
| 2025/0113819 | A1* | 4/2025 | Denmon ............... | A01M 31/06 |
| 2025/0241293 | A1* | 7/2025 | Denmon ............... | A01M 31/06 |

* cited by examiner

PRIOR ART

PRIOR ART

MOTORIZED FLAPPING DECOY APPARATUS WITH SPLASHER

CROSS-REFERENCE TO RELATED APPLICATIONS

This application claims benefit of priority under 35 U.S.C. § 119(c) of U.S. Ser. No. 63/542,563, filed Oct. 5, 2023, the entire contents of which is incorporated herein by reference in its entirety.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

FIG. 5A is a top-down view; FIG. 5B a side view; FIG. 5C is the bottom-up view; and FIG. 5D the opposing side view.

FIG. 6A is a top-down view; FIG. 6B is a side view; FIG. 6C is the bottom-up view; and FIG. 6D is the opposing side view.

FIG. 7A is a perspective view; FIG. 7B is a side view; FIG. 7C the opposing side view; FIG. 7D is an end view; and FIG. 7E the opposing end view.

FIG. 8A is top-down view; FIG. 8B is a side profile view; and FIG. 8C is an end profile view.

FIG. 9A is a perspective view; FIG. 9B is a side profile; FIG. 9C is a top-down view; FIG. 9D is an opposing side profile; and FIG. 9E is the bottom-up view.

FIG. 11A is a front profile; FIG. 11B is a side profile of top connector bracket 73*a*; FIG. 11C is the back profile; and FIG. 11D is a side profile of bottom connector bracket 73*b*.

BACKGROUND OF THE INVENTION

Figure 1:
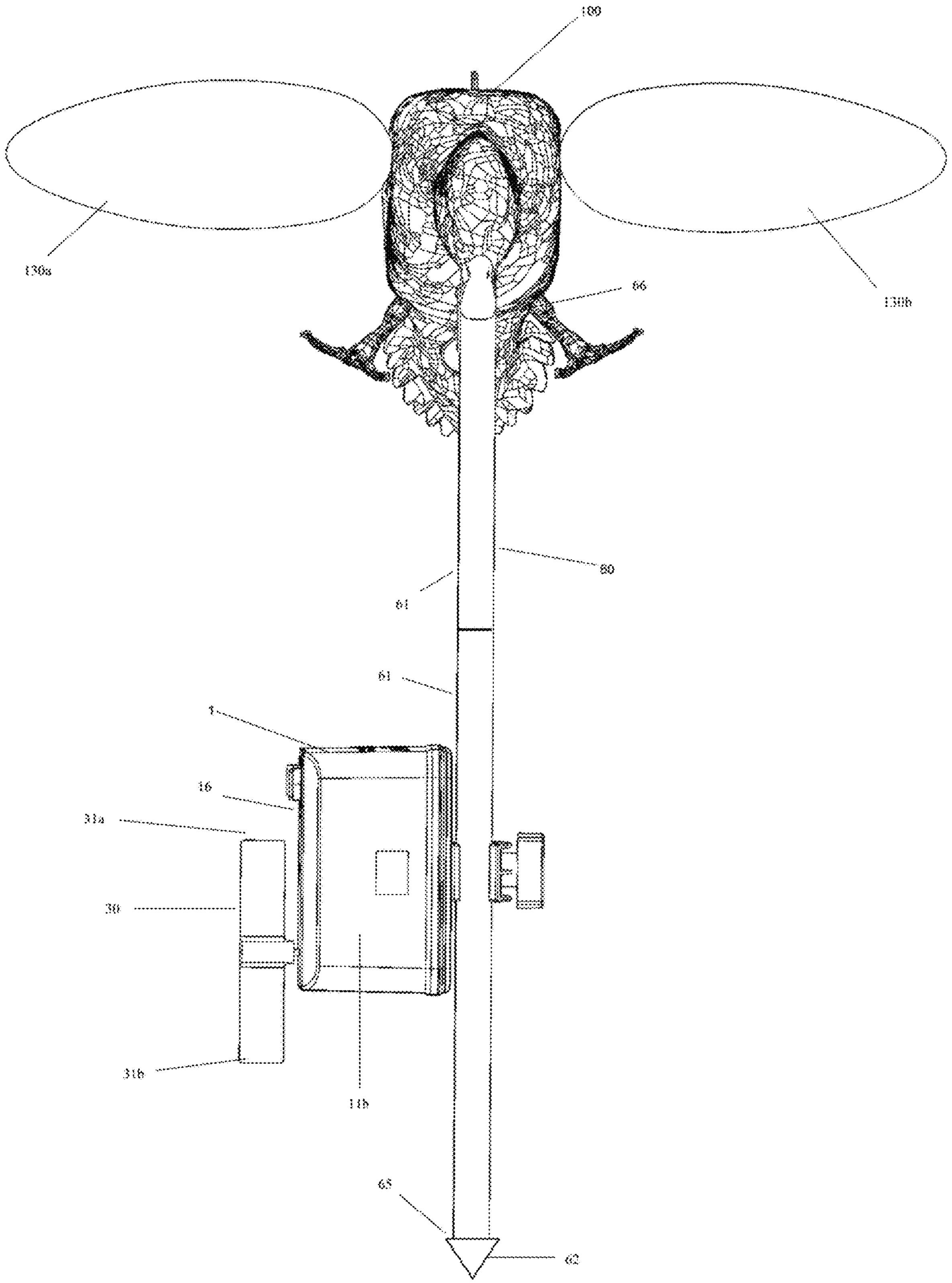
FIG. 1 depicts one embodiment of the decoy apparatus with a splasher unit 1 and a decoy unit 100 deployed in a body of water.

Outdoor enthusiasts, recreational hunters, and photographers have long recognized that live animals and game, and particularly live waterfowl, are attracted to areas that appear to be inhabited by similar animals. For this reason, people have used decoys, which may refer to artificial animals, to attract live game to within shooting distance of a hunter's rifle, shotgun, or other weapon, and within prime viewing distance of photographers and other outdoor enthusiasts such as bird watchers.

Although the term "game" is used herein to describe the animal intended to be attracted or repelled by the decoy (depending on the usage), it is understood that this is not meant to limit the usage to the hunting application as numerous uses are conceived. Conventional decoys have limited success as game, particularly avian game, and waterfowls, have become decoy-wise. Migratory birds for example have terrific eyesight at long distances, especially when it comes to the sighting of motion.

There are numerous types of decoys. Traditional, stationary decoys may give the appearance of birds sitting on the water, but they are not particularly noticeable on their own from the perspective of a flying animal at a distance. As such, an entire industry has formed for motion decoys, which provide some semblance of life-like movement. For example, it has been noticed that game animals can see the flashes or strobe of a feeding flock of birds from great distances. Therefore, hunters have created and used motion decoys such as those set forth in U.S. Pat. Nos. 6,508,028; 6,079,140; 10932462, which are incorporated herein by reference, to attract game to a prime shooting location. Other decoys move in the water to give the look of a swimming duck, and yet others include pumps to cause splashing to give the look of a diving or swimming bird. While the motion decoys have experienced wild success in the past, they are not without their own deficiencies, and room for improvement exists. For example, the spinning wing decoys are often positioned close to the surface of the water to mimic the look of a landing waterfowl. But the decoys never exhibit any of the obvious markers of a landing duck, such as the splash or movement of water associated with a duck's landing or taking off. A decoy device is provided herein which may provide additional attractant properties to a decoy or to a decoy spread, which may include water movement, splashing, and/or flashing features, to assist the decoys in mimicking the look and/or movement of real animals.

SUMMARY OF THE INVENTION

A decoy device is provided herein which may provide a water feature. The water feature may comprise a splashing feature. The water feature may be caused by a splasher, a pump, a rutter, or other mechanical device which contacts the water.

The decoy device may comprise an apparatus which may provide a water feature on its own or may be used in connection with another decoy component. The decoy apparatus comprises a mechanism for creating a water feature and a mechanism that mimics the look of an animal. In a preferred embodiment, the mechanism that mimics the look of the animal may further comprise a motion feature, such as a spinning or flapping wing.

In one or more embodiments, the decoy apparatus comprises a housing unit, a motor, a power source in communication with said motor, and a splasher, wherein the motor is configured to act upon the splasher and the splasher is configured to contact a body of water at least when acted upon by the motor to move the water.

The water feature may include water movement, ripples in the water, splashing, the movement of water droplets in the air, the creation of waves, or a combination of one or more of the foregoing.

In one or more embodiments, the decoy apparatus splasher may also cause a flash or strobe effect as the motor causes it to rotate.

In at least one embodiment, the decoy device comprises a splasher mechanism and a decoy unit, said splasher mechanism comprising a housing unit, a motor, a power source in communication with said motor, and a splasher, wherein the motor is configured to act upon the splasher and the splasher is configured to contact a body of water at least when acted upon by the motor to move the water; wherein said decoy unit comprises a decoy body shaped to mimic the look of at least a portion of an animal, preferably an avian animal, and even more preferably, a waterfowl. In at least one related embodiment, the decoy unit may comprise a motor and at least one motion member, wherein said motor is configured to act on said at least one motion member and said motion member is configured to mimic the look or motion of a wing, tail, leg or foot of the animal. In one or more embodiments, the decoy unit may comprise wings that spin or flap. In at least one embodiment, the decoy unit comprises wings which are acted upon by the motor to rotate at a rate of between 100-500 rpm, between 200-400, and between 250-350 rpm, or at rates there between.

In a related embodiment, the decoy apparatus may further comprise a mounting means, which may be a support pole or post, and the decoy unit and the splasher mechanism may be connected to the support pole.

DETAILED DESCRIPTION OF THE INVENTION

The decoy apparatus may include one or more housings, one or more motors, one or more splashers, one or more power sources, one or more wing members, one or more support members, one or more controllers, and one or more connectors through which a housing may be connected to the one or more support members.

Turning to the FIG. 1, a decoy apparatus is disclosed herein that may comprise a splasher unit 1 and a decoy unit 100. Turning to FIGS. 2-13, an embodiment of a decoy apparatus comprising a splasher unit 1 is presented. The splasher unit 1 may include a housing 10, a motor 20, a splasher 30, a power source 40, a control mechanism 50, and a support member 60. The motor 20 may be in operative communication with the power source 40 and splasher 30 such that the power source 40 may provide the requisite energy for the motor 20 to act upon the splasher 30. Furthermore, the housing 10 may be selectively mounted to the support member 60 via a connector 70.

Turning to FIGS. 1-6, an embodiment of a suitable housing 10 is presented. It is preferable in some applications that the electronic components be shielded from the elements. In one or more embodiments, at least one of the electrical components, which may include the motor, power source, electronic actuators, controller, receivers, transmitters, and connecting wiring, may be partially or fully housed in a housing unit. In alternate embodiments, the housing may be a fully enclosed housing and in others, the housing may merely act as a partial shield to one or more environmental factors. In alternate embodiments, the housing may be substantially waterproof. The housing may include various housing members 16. The housing members may combine to form a single housing member. For example, the depicted housing comprises a top housing member or lid 16*a* and a bottom housing member or base 16*b*, which can be connected to each other. These connections may be permanent, semi-permanent, or removable. In at least one embodiment, the housing members 16 may be removably connected to each other to allow access to the contents of the housing. Waterproofing means, such as gaskets, flashings, o-rings, and threading may be employed at any or all connections to reduce water intrusion into the housing unit.

As depicted, the housing 10 may be a rectangular prism comprising six sides, including four side walls 11*a, b, c, d*, a top 12, and a bottom 13 to define an exterior shell and a cavity interior to the shell. The housing unit may provide at least some protection from the elements such as water. The housing may include the mechanical and electrical components such as the motor 20, power source 40, control mechanism 50, and wiring through which these components may be operatively connected to each other. Although the depicted embodiment is represented as a rectangular prism (or substantially similar thereto), it is recognized that the housing may include one or more of various shapes, including cube, cuboidal, spherical, cylindrical, or any other three-dimensional shape that is capable of at least partially encapsulating the desired mechanical and/or electrical components. In other embodiments, the housing may simply comprise a mount to which mechanical and/or electrical components may be directly or indirectly connected.

The housing unit 10 can include one or more support members 15. The one or more support members can be optionally attached to any of the electric motor, power source, rechargeable battery, electric motor housing, battery housing units, and mounting peg. The support members may include saddles such as motor saddle 22, joists such as joist 15*b*, mounts such as 15*a*, clamps, bays, or fasteners. The external of the housing unit may also include attachment means for connecting extra parts or parts which are not in use, such as a splasher.

In an embodiment, the power source 40 can include, but is not limited to, a removable rechargeable battery, a permanent rechargeable battery, a removable non-rechargeable battery or batteries, or combinations thereof. Additionally, the power source may include a solar source. One having skill in the art would recognize that multiple types of power sources can be used to provide the requisite power. For example, the power source may comprise one or more of any battery known in the art from 1-24 volts.

Figure 3:
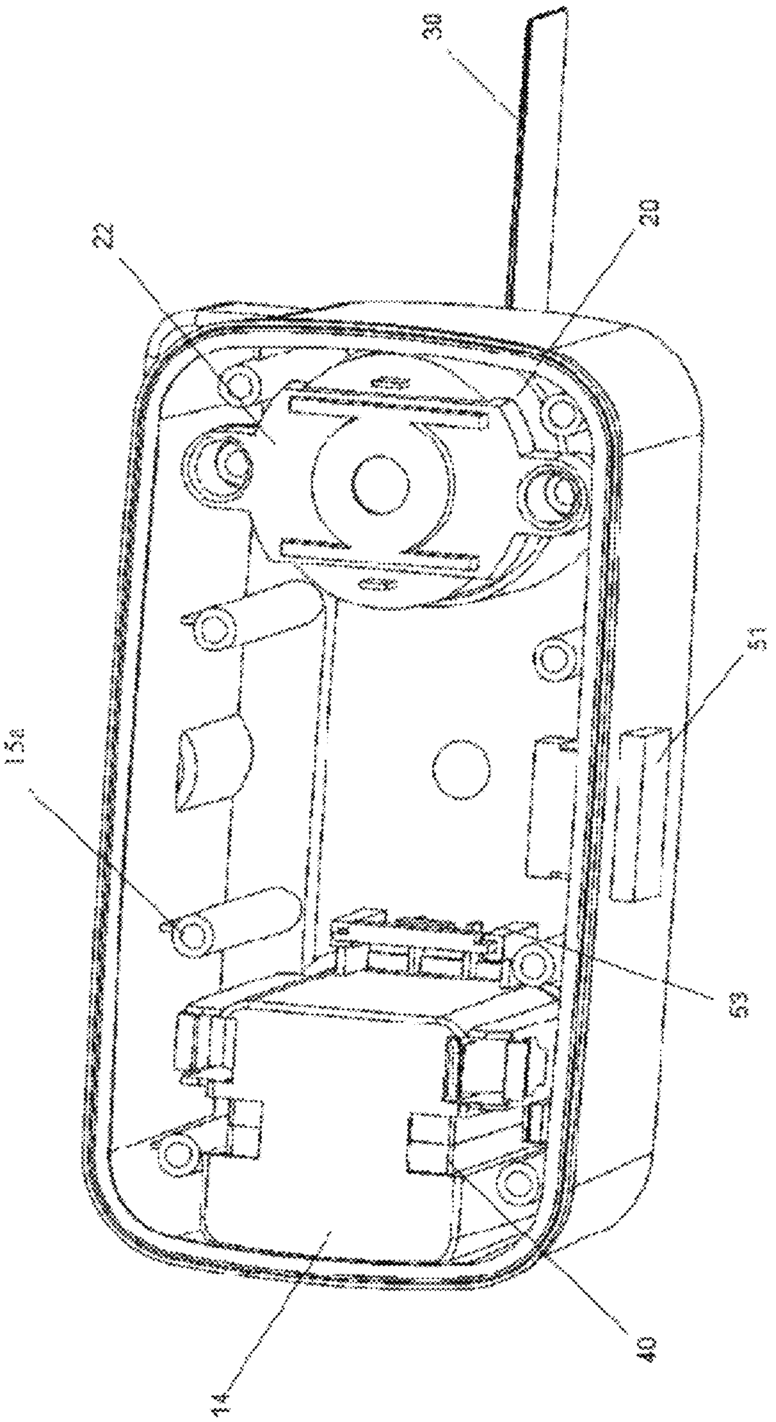
FIG. 3 depicts a top-down view of the base of the housing unit with the lid removed.
Figure 4:
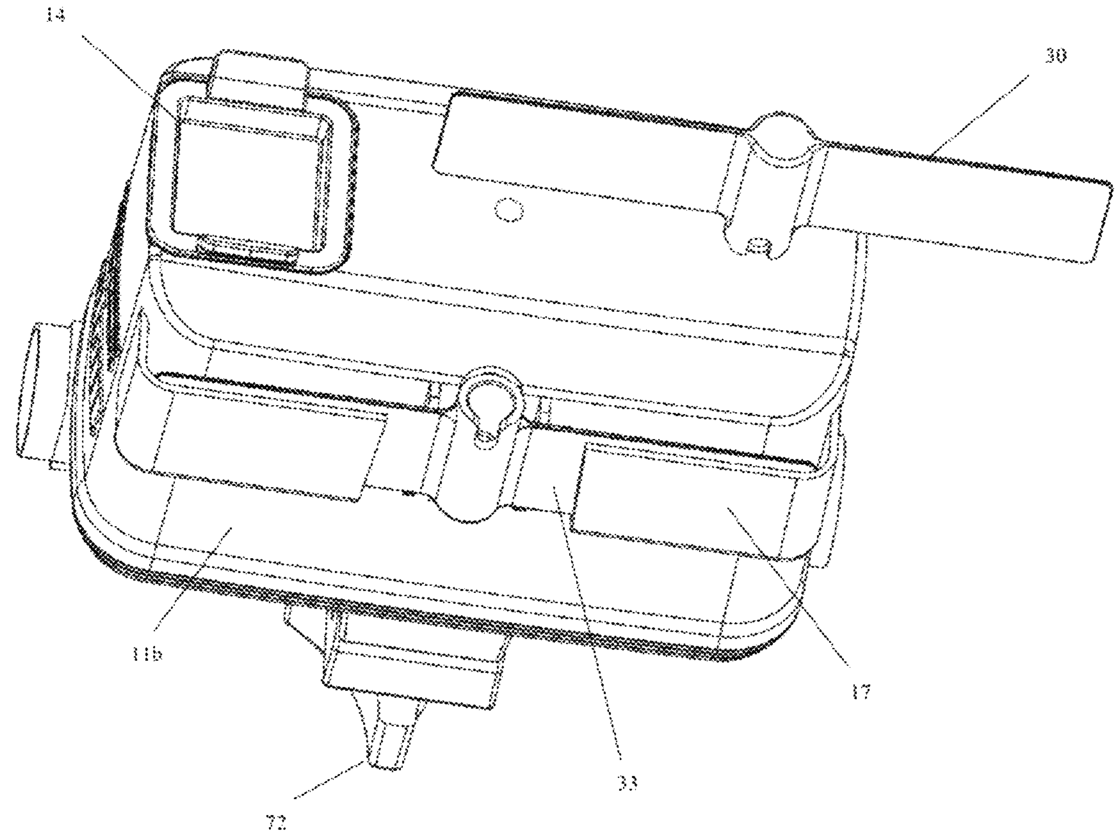
FIG. 4 depicts the opposing bottom-up view of FIG. 2.
Figure 5A:
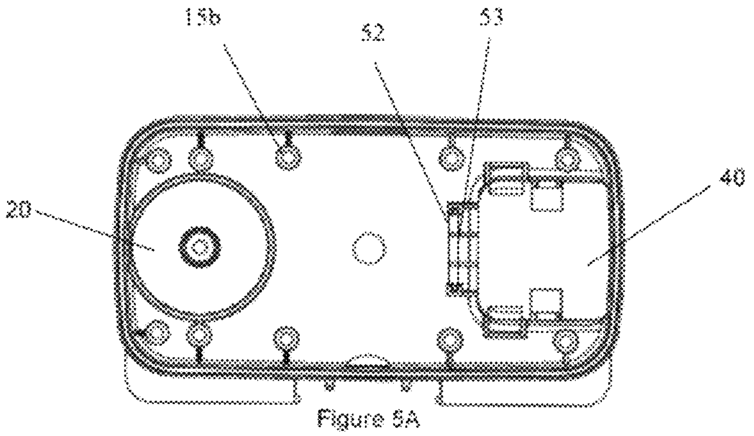
FIGS. 5A-5D depict various images of the base unit with the lid removed.
Figure 5B:
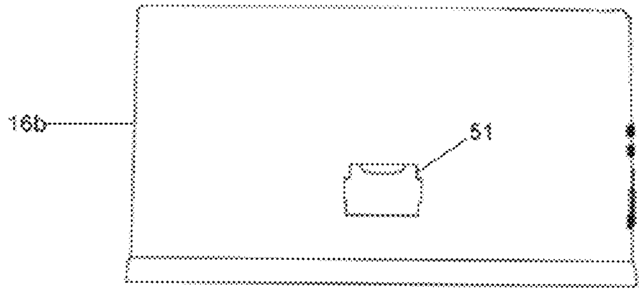
Figure 5C:
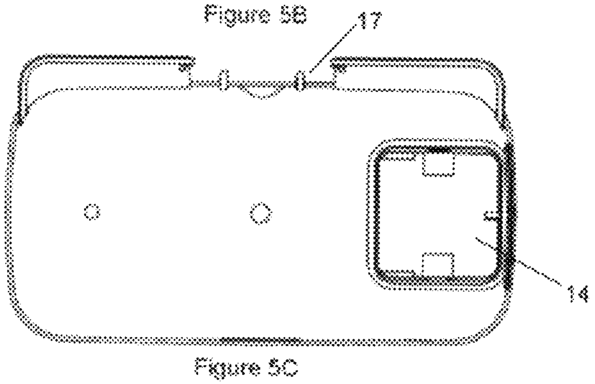
Figure 5D:
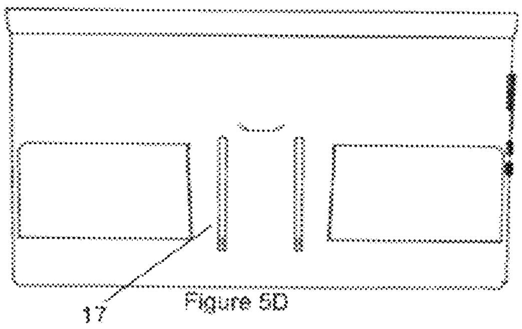
Figure 6A:
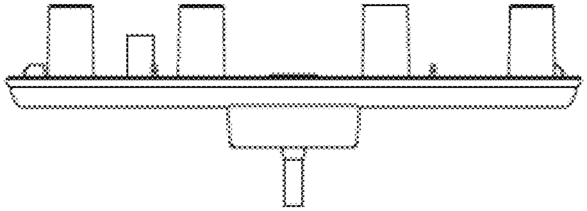
FIGS. 6A-6D depict the lid of the housing unit from multiple angles.
Figure 6B:
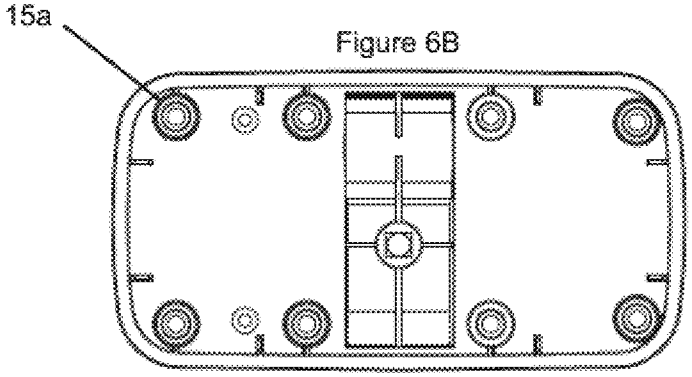
Figure 6C:
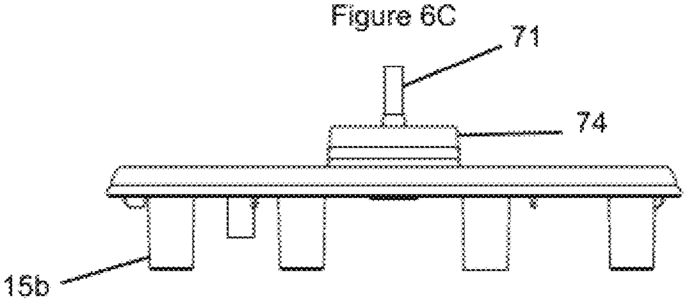
Figure 6D:
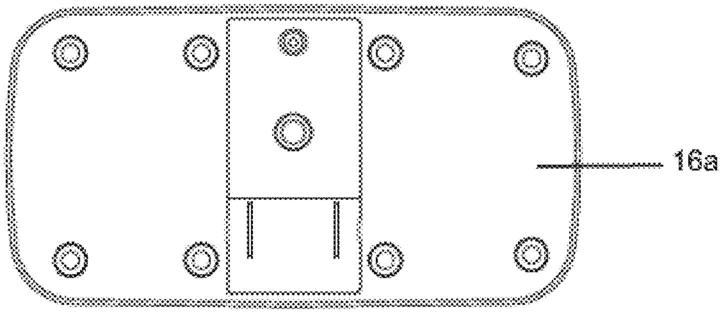
Figure 7A:
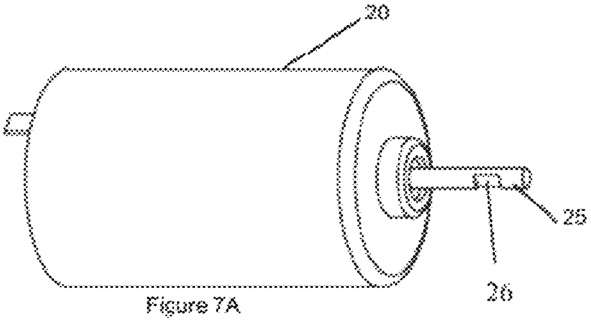
FIGS. 7A-7E depict various images of a motor 20, including
Figure 7B:
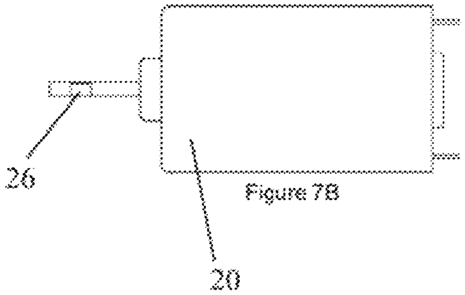
Figure 7D:
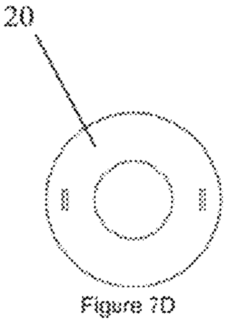
Figure 7C:
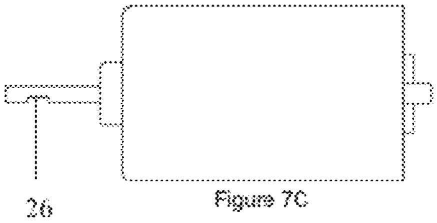
Figure 7E:
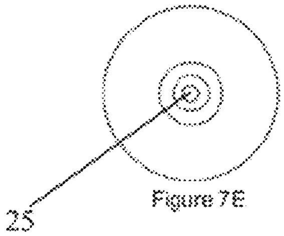

As shown in the depicted embodiment, particularly in FIGS. 3 and 5, the power source 40 may be located within the housing unit 10. The battery housing can be attached or coupled to a saddle of the housing unit. The power source may be accessible from the exterior of the housing unit. For example, the housing unit may include a power bay 14 into which a removable battery may be inserted. This set up may be employed in any number of configurations, such as to allow a user to insert, remove, and replace the batteries in an embodiment that employs replaceable batteries, such as a removable, non-rechargeable battery. Likewise, a port or wire conduit in communication with the power source may be formed through a wall of the housing unit. Such port may be used to connect the power source to an external apparatus. The port may be a charging port which may be used to operatively couple (removably or permanently) the power source to a charger or other external energy supply. The port or conduit may also be operatively connected to the power source to transmit power away from or out of the housing unit. In such an embodiment, the power source may be operatively connected to an external apparatus to provide power thereto, including a light, a remote charger, a transmitter, another decoy apparatus. Suitable plugs may include barrel plugs or barrel connectors, 0.7 mm-12 mm plugs, greater than 12 mm plugs, USB plugs of any type (micro, Type-A, Type-B, Type-C, etc.), AC 1, AC 2, 2-pin, 3-pin, 4-pin, 5-pin, 6-pin or greater, CHAdeMO, CCS (combined charging system), Type 1, Type, 2, Type 3, DIN connectors, 6.35 mm connectors, 3.5 mm connectors, 2.5 mm connectors, RCA connectors, HDMI connectors, molex connectors, IEC connectors, JST connectors, a GB/T, or a J1772 (or type 1), and the like etc. A plug may be used to seal the port when not in use. The plug may be attached to the housing for storage when not in use.

The connection of the housing unit to the power source is preferably performed in a manner to reduce water intrusion. The connection may include gaskets, o-rings, flashings, covers, plugs, and other means to reduce water intrusion to the power source, into the housing unit, or both. For example, in an embodiment that employs a port, the port preferably should be scalable such as by a plug or other means known in the art. Likewise, in an embodiment that employs a power bay, a gasket and groove may be used to seal any gaps between the power source and the housing unit.

Figure 2:
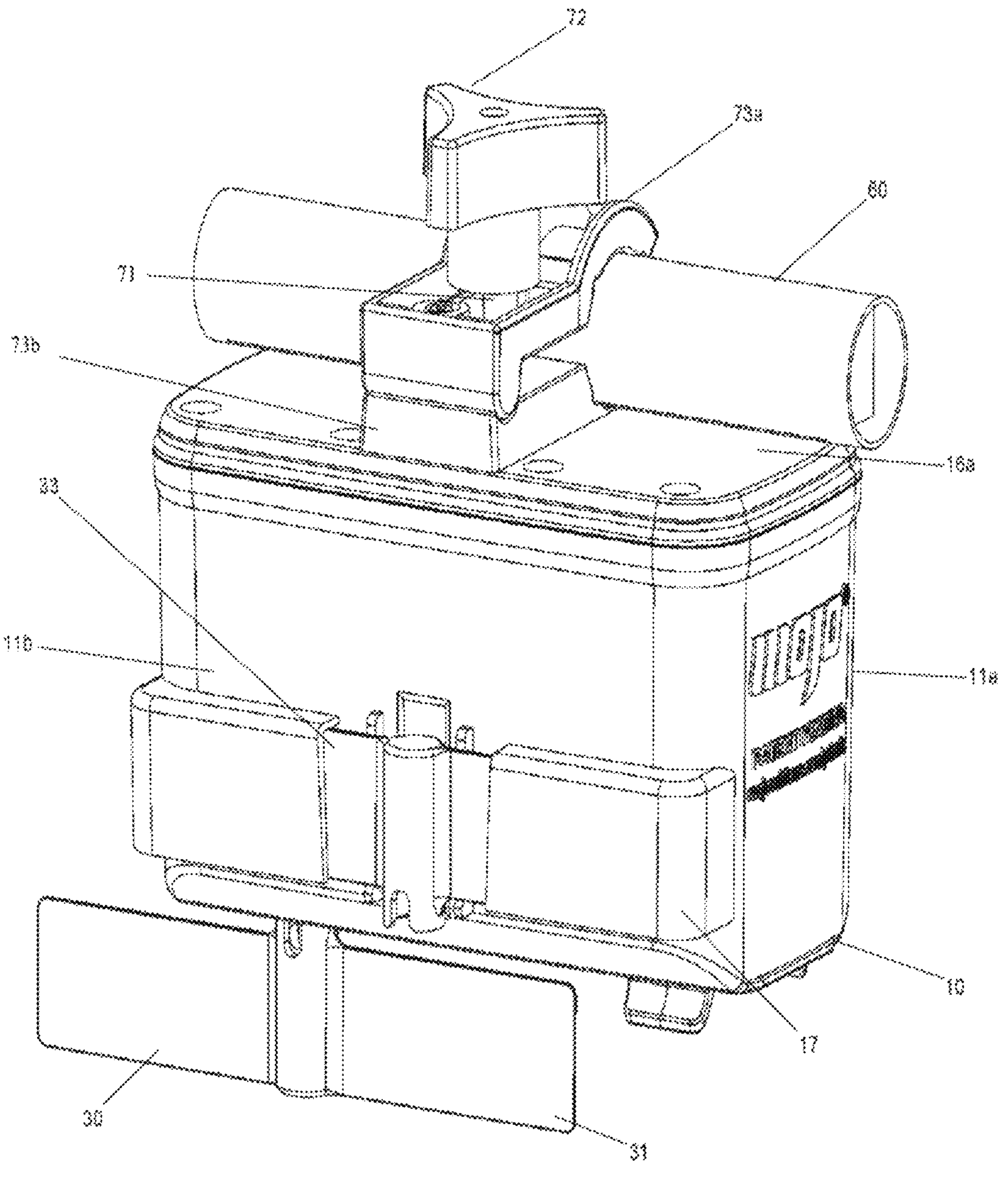
FIG. 2 depicts a profile view of the splasher unit housing unit connected to a portion of a support member.

Turning to FIG. 2, the housing unit may also include a splasher holder 17 for connecting the splasher to the housing unit. The splasher holder 17 may include any number of attachment means. As depicted, the splasher holder 17 comprises a slide and catch to allow the insertion of the splasher 30. Such may be used to house the splasher when not in operation or to hold a replacement splasher 33.

The housing unit may also include concealment means to help camouflage it. For example, the concealment means may include artificial or real foliage, camouflage patterns, mesh, and paint patterns to mimic the surrounding area.

The power source may also be provided external to the housing. For example, as discussed herein, the splashing unit may be employed in connection with a decoy unit. A single power source may be used between the two units, which may be located on either the splashing unit or the decoy unit. Likewise, the power source may be located external to either or both units, with wires connecting the applicable unit to the power source. In at least one embodiment, the power source may be provided by an external outlet.

The power source may be operably connected to control mechanism 50. As depicted, control mechanism 50 includes a switch or button that can turn the decoy's electric motor on and off. The control mechanism 50 may include, in one or more embodiments, switches, timers, PC boards, receivers or transceivers, such as for receiving a signal from a remote, and the like. The switch may be multi-positional and allow a user to switch between "off" and various settings of "on". The switch may be accessible from the exterior of the housing unit. As shown in the depicted embodiment, the switch may be connected to the exterior of the housing unit, with a wire that transgresses through the desired wall of the housing unit and into the interior chamber defined by the housing unit. The switch wire may be connected to at least one the motor, the power source, and/or a control mechanism.

Figure 8B:
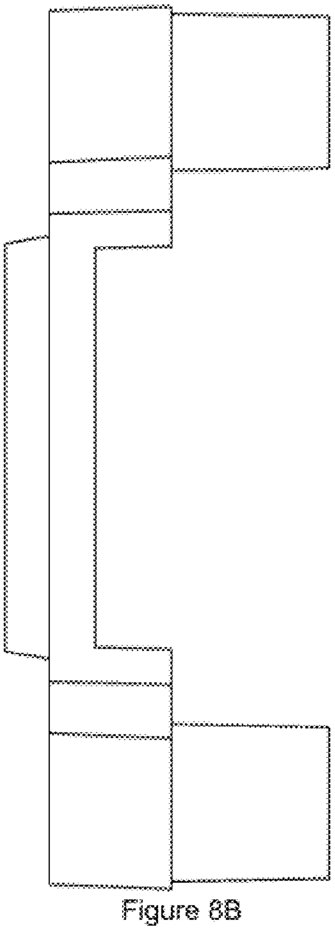
FIGS. 8A-8C depict a motor saddle or bracket.
Figure 8A:
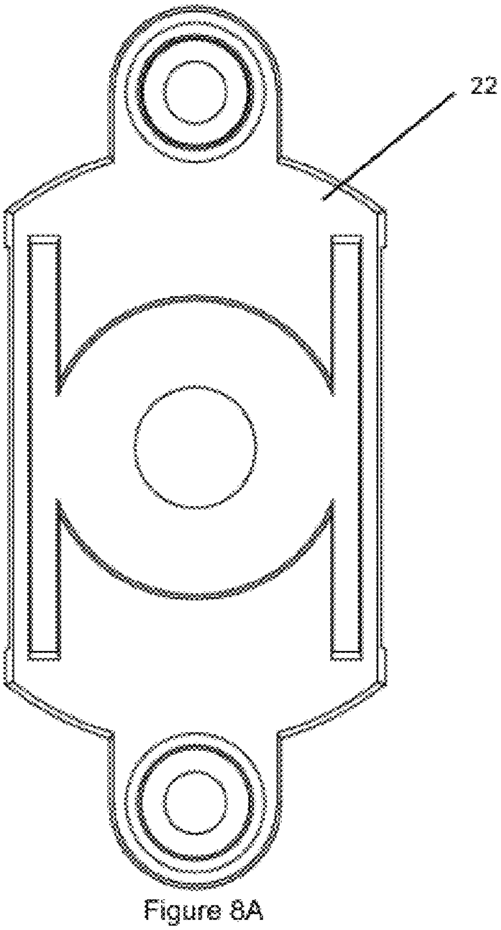
Figure 8C:
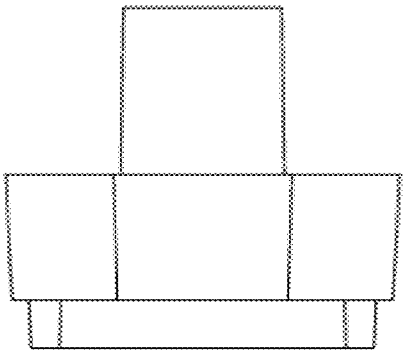
Figure 9A:
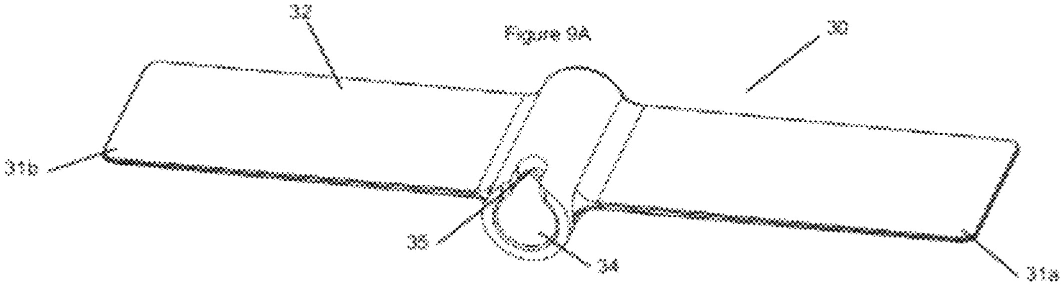
FIGS. 9A-9E depict a splasher 30.
Figure 9B:
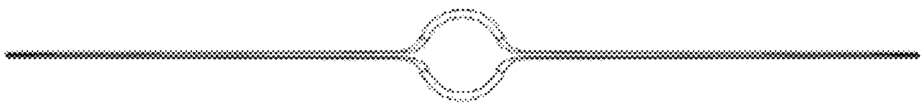
Figure 9C:
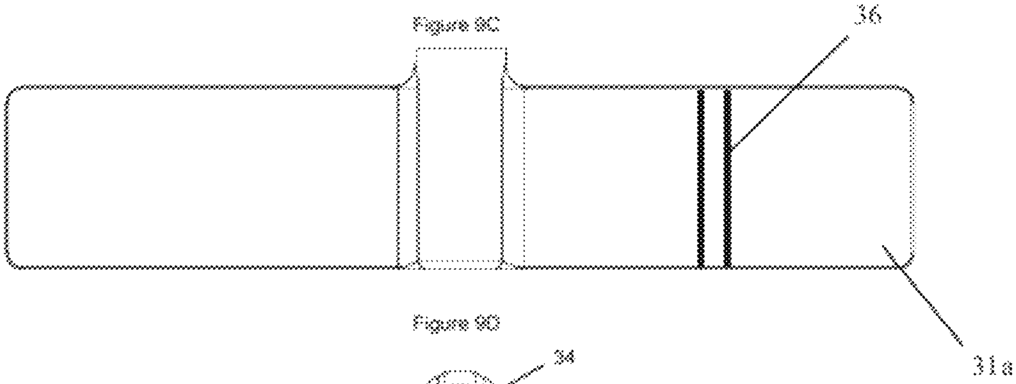
Figure 9D:
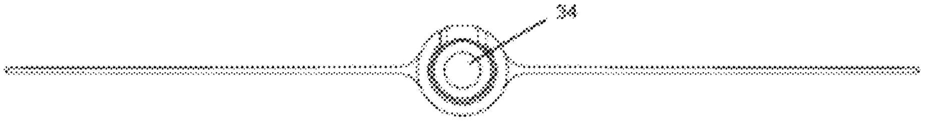
Figure 9E:
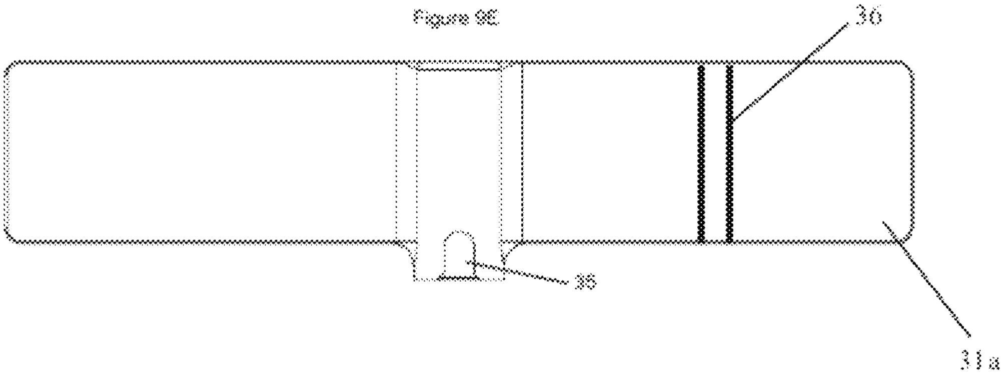
Figure 10:
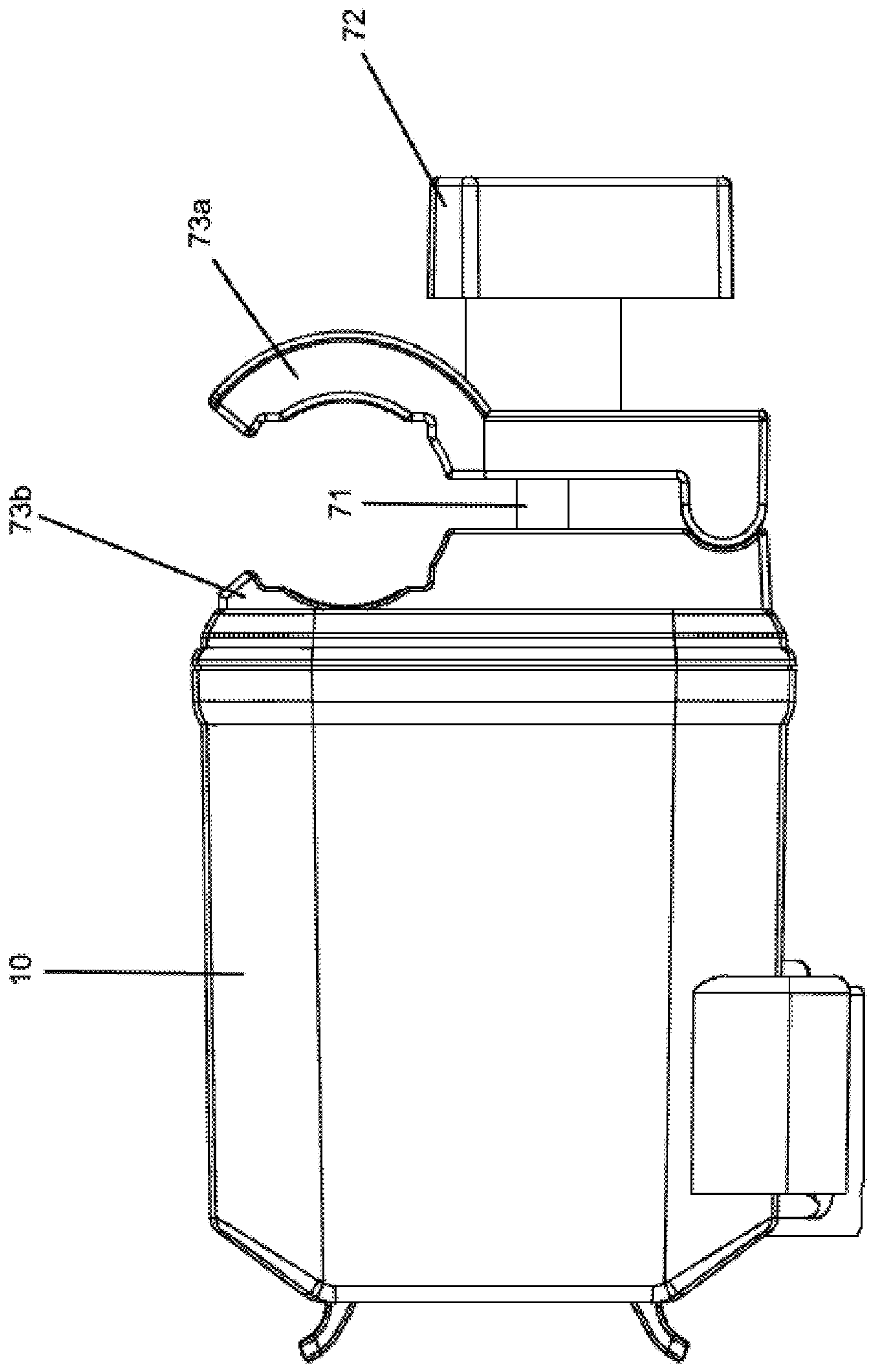
FIG. 10 is a side profile view of the housing unit to show an embodiment of a suitable connector.
Figure 11D:
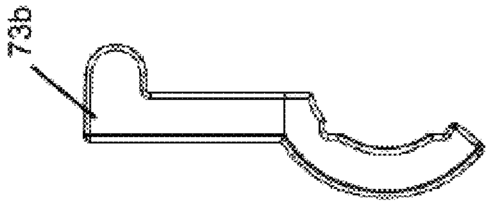
FIGS. 11A-11D present various views of the connector shown in FIG. 10.
Figure 11C:
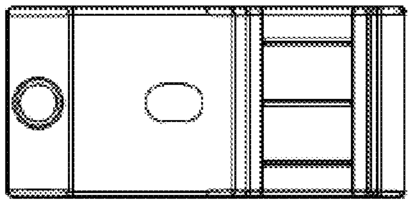
Figure 11B:
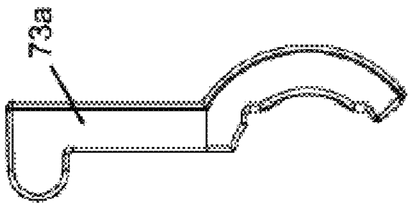
Figure 11A:
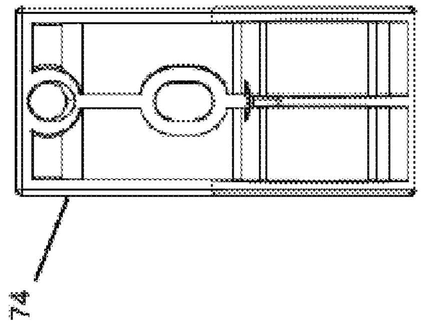
Figure 12:
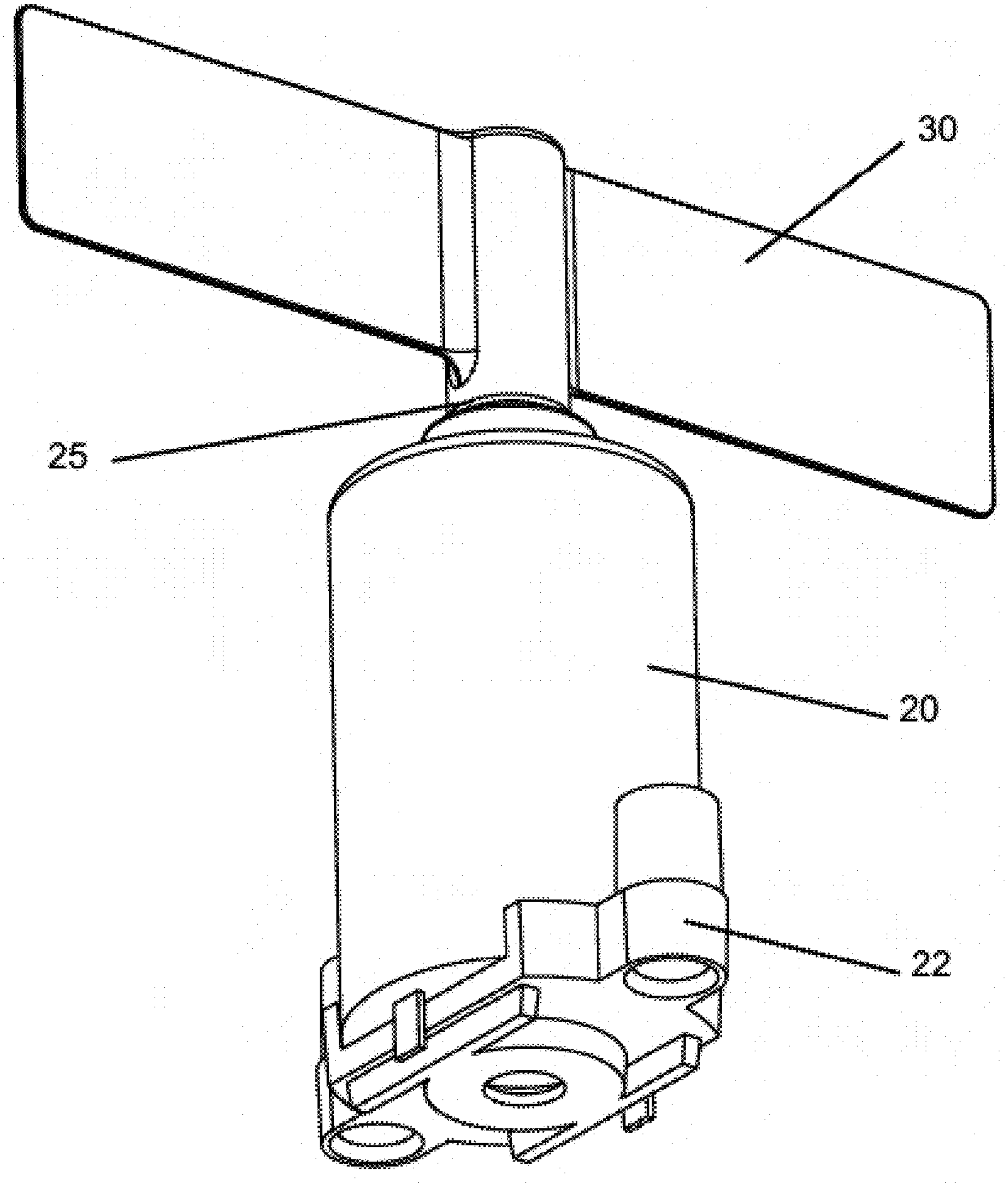
FIG. 12 depicts the motor connected to the splasher with the housing unit removed.
Figure 13:
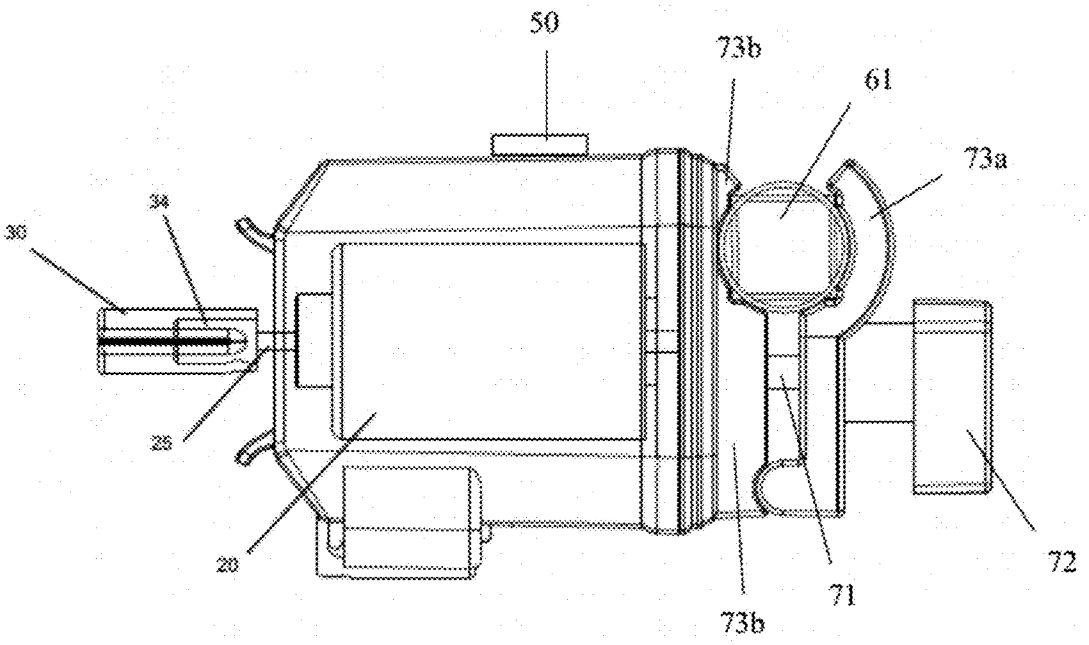
FIG. 13 presents a similar image to FIG. 12 with additional components such as the connector, housing unit, and support member in shadowed wireline.
Figure 14:
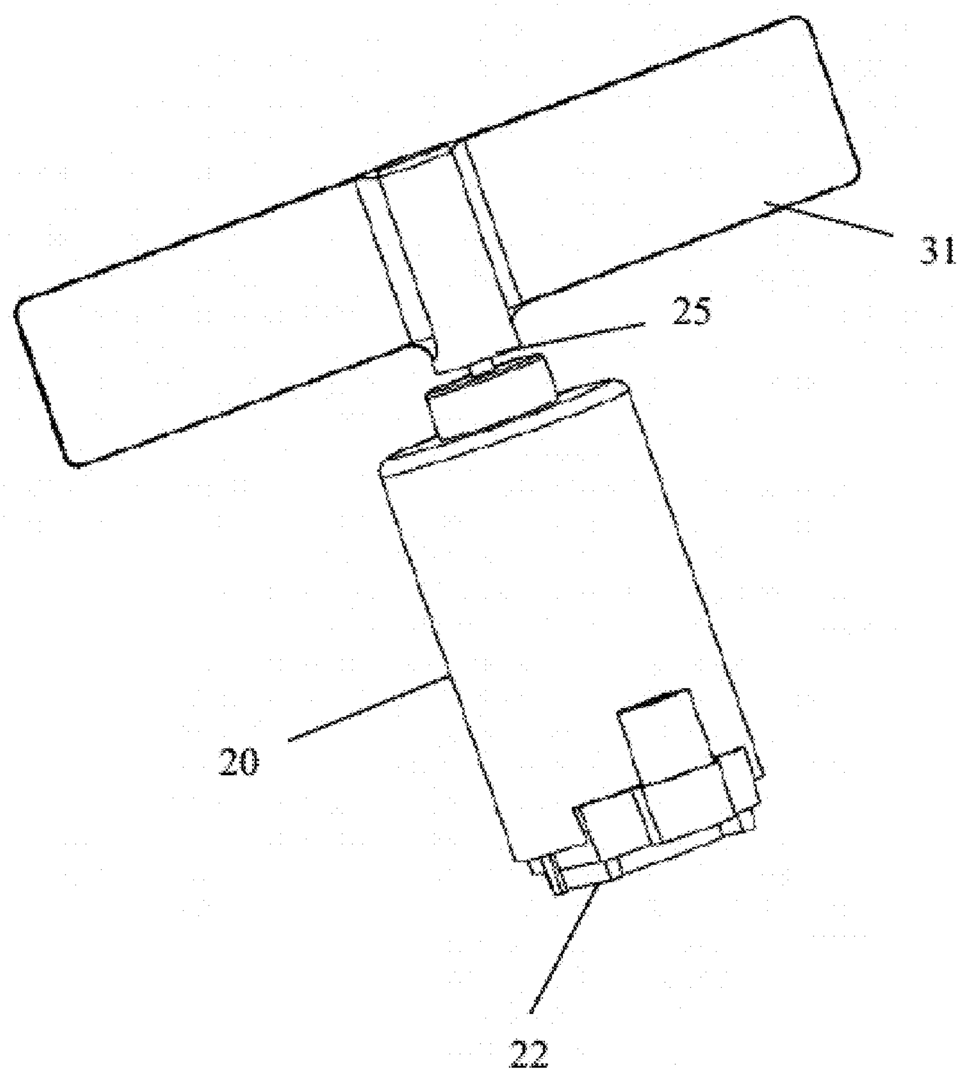
FIG. 14 depicts an embodiment of a connection between the motor and the splasher.
Figure 15:
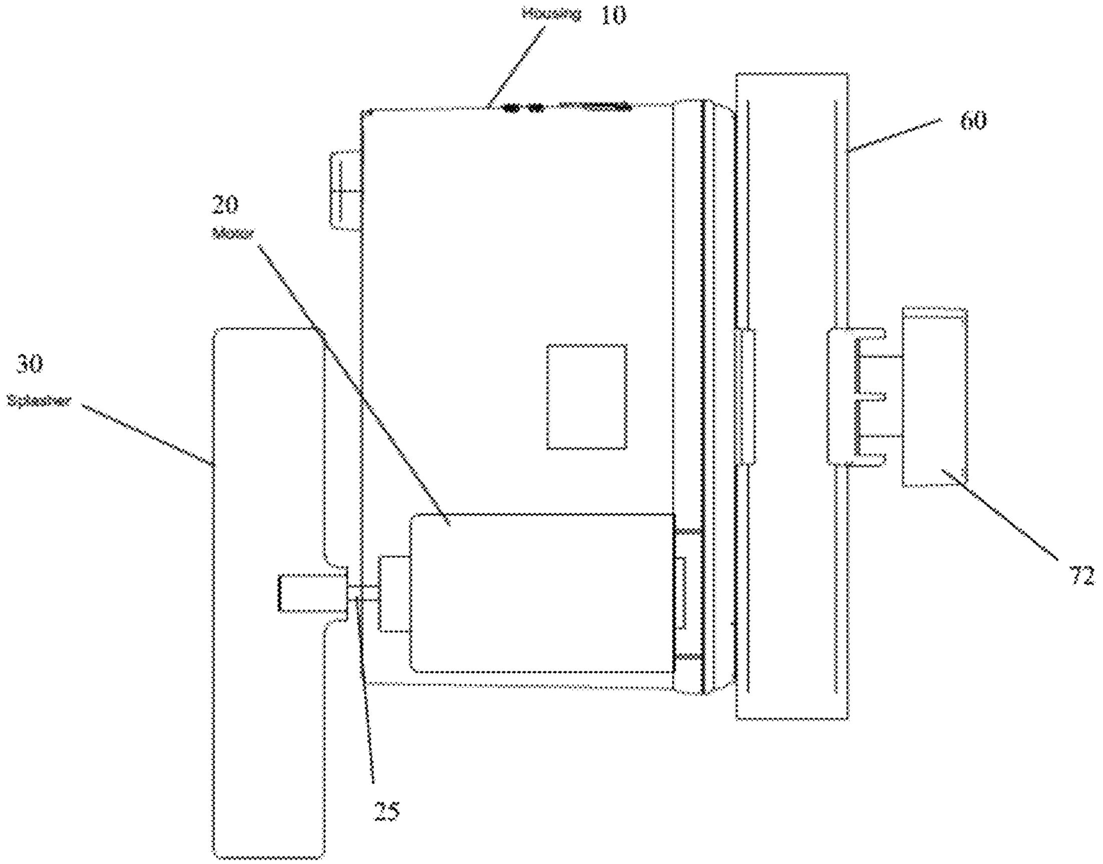
FIG. 15 depicts a cut-out view of an alternative embodiment which mounts around a pole member.

The motor 20 may be a DC or an AC motor. One embodiment of a motor is provided in FIG. 7. The motor may be attached to a drive shaft which is acted upon by the motor. The motor may be a direct drive motor. The motor may be a variable motor, capable of acting upon the drive shaft at variable speeds as set. The motor may be capable of operating in two directions, referred to herein as the "forward" and "reverse" directions. The motor may comprise a reverser to cause the motor to move in the reverse direction and back to the forward direction. The motor 20 may be housed within the housing 10. The motor may be operatively connected to one or more of the power sources, a controller, or the splasher. These connections may be direct or indirect. In an embodiment, the electric motor 20 can be optionally and directly connected to the power source 40 using a wire. This direct connection from electric motor to the removable battery can provide the user with the ability to operate the electric motor in the event that other electrical components fail, such as the switches, timers, PC boards, and other controller mechanisms. The motor may be securely mounted to the housing unit. The housing unit can include a motor saddle 22. FIG. 8 presents multiple angles of one embodiment of a suitable saddle. The saddle can include a shape that holds the electric motor securely. The motor may be mounted to the housing unit in a manner to dilute the vibrational effect caused by the operation of the motor. Such may include the use of dampeners or by mounting the housing unit securely to an external support member, such as support member 60. FIGS. 12 and 14 show the splasher coupled to the motor with the housing removed, and FIGS. 13 and 15 show the motor and splasher sitting within the housing.

The motor 20 is operationally connected to a drive shaft 25. The motor is configured to rotate the drive shaft. The motor may rotate the drive shaft in one direction or in multiple directions. The motor may operate at a fixed speed, or it may operate at a variable speed. The motor may rotate the drive shaft at 0-800 rotations per minute, 100-900 rpm, above 200 rpm, above 300 rpm, above 400 rpm, above 500 rpm, above 600 rpm, above 700 rpm, above 800 rpm, between 300-800 rpm, between 350-750 rpm, between 700-800 rpm. The motor may be operatively connected to a splasher such that the motor can act upon the splasher. The motor may be indirectly or directly connected to the splasher. The motor may be connected to one end of the drive shaft and the splasher connected to the other end of the drive shaft. The drive shaft may be located at least partially interior to the housing unit and partially exterior to the housing unit. The drive shaft may be connected to one or more adapters which in turn may be connected to the splasher, the motor, or both. The drive shaft may also employ a notch or slot 26 (best seen in FIG. 7) to help connect the drive shaft to the splasher. In an embodiment, the motor may be located interior to the housing unit, the splasher located exterior to the housing unit, and the drive shaft or the drive shaft and one or more adapters may extend through the housing unit connecting the motor to the splasher.

When acted upon by the motor, the splasher rotates, causing it to contact and move water (e.g., causing a splash). The splasher 30 may include a body 32 with a width and defines a length with two opposing ends 31*a,b*. The splasher may define a length between 1-16 inches, between 2-12 inches, or between 3-8 inches. The splasher may be substantially flat or it may be at least partially curved on at least one end. In one embodiment, the splasher may curve at or near at least each of the two ends 31*a,b*, and each may curve in the same direction. In alternative embodiments, the two ends may curve in opposing directions. One having skill would recognize that the splasher may come in various shapes or sizes. For example, the splasher may include a wheel, a rutter, or other means that can move water when making contact therewith.

Turning to FIG. 9, the splasher 30 may be connected to the drive shaft 25 or the motor 20 either directly or indirectly such as through an adapter, such as splasher attachment socket 34. Additionally, the splasher may be guided into position on the drive shaft or adapter, or otherwise secured in place, by use of splasher attachment cutout 35. The splasher 30 may be permanently, semi-permanently, or preferably removably attached to the motor or the housing unit. The splasher may be connected via any number of fasteners or fastener means, including mechanical fasteners, chemical fasteners, magnetic fasteners, or a combination thereof. Suitable examples may include clamps, screws, bolts, slide bolts with or without catches, magnets, glue and the like. In at least one embodiment, a combination of a magnet and screw may be used. The splasher is preferably located and sized such that, when the splasher is in a vertical orientation, at least a portion of the splasher extends below the base of the housing unit. In such an orientation, the entirety of the housing unit may be located above the water when in operation while the splasher remains able to contact the water when acted upon by the motor.

The splasher may be monochromatic or it may include two or more colors. The splasher may have areas of light or dark patterns. At least one end of the splasher may include a color that is different from the middle of the splasher. One side of the splasher may be a different color than the other, and preferably, one side would be lighter than the other, and the other side darker. The splasher may have a lighter color on at least one side on one or more of the ends. For example, in one embodiment, the splasher may be white or another light color on one side, and the other side may be black or another dark color. In another embodiment, the areas near the ends of the splasher may be a light color such as white, and the length between the ends may be a dark color such as black. The dark color may also be a camouflage pattern. As shown in FIG. 9, the splasher may have an indicator 36 on it to guide users to a preferred placement of the splasher (and thus the splasher unit) relative to the water. The indicator may include a marking or a notch. The indicator may include the lighter area near the end of the splasher. The splasher may be located or configured such that only a portion of the splasher contacts the water. In one or more embodiments, less than one inch of the splasher will enter the water when rotating. In one or more embodiments, the splasher may be configured such that between 0.1 and 1 inch, between, ¼ and ⅝ inch, less than ⅝ inch, less than ½ inch, and between ⅜ inch to ½ inch of the splasher may enter the surface of the body of water when in operation. The splasher 30 may be substantially straight, may be at least partially curved either on one or more ends or across the entire splasher, or may be arcuate in shape.

The splasher unit 1 may include a controller mechanism 50 which may include one or more receivers, one or more transmitters, one or more transceivers, one or more switches, one or more timers, one or more PC boards, and one or more remotes. As depicted, the splasher unit may include a switch 51. The switch 51 may be a two-position switch, a three-position switch or may have more than three positions. The positions of the switch may include off, on, one or more cycles, remote control, or other configurations. The configurations may also correspond with the speed at which the splasher is turned. For example, in an embodiment employing a three-way switch, one position may be off, a second position may to operate at a medium or normal speed, and a third position may cause the motor to spin the splasher at a more vigorous speed. The control of speed may assist with longevity of battery life. The controller may include one or more timers 52 connected to a PC board 53 which are in communication with the power source 40 and the motor 20. The controller may further include a remote 54, which may be programmable. In such an embodiment, the controller may include a receiver or transceiver to receive a signal from the remote. Additionally, the controller may be configured to reverse the direction of the motor, causing the direction of the splashing to invert.

In one embodiment, the controller comprises a three-position switch, one or more timers, and a PC board. In such an embodiment, the switch positions may correspond to Cycle 1, Cycle 2, and off. In Cycle 1, the controller may be configured to actuate the motor, causing it to rotate the splasher at an intermediate speed for a period of time, then the timer will cause the controller to turn off the motor for a period of time before the cycle repeats. For example, cycle 1 may cause the splasher 30 to rotate for a period of 5 seconds, then turn off for a period of 5 seconds, before actuating the motor again. The controller may be configured to reverse the direction of motor after each run. Cycle 2 may be a more vigorous cycle designed to cause increase splashing to mimic a flurry. Cycle 2 may be configured to actuate the motor at a higher rotation per minute than Cycle 1 for a longer period of time and with a shorter period of rest in between. For example, in Cycle 2, the controller may actuate the motor at a higher rotation per minute as compared to Cycle 1 for a period of 8 seconds, with 3 seconds of rest between cycles. Again, the controller may be configured to cause the motor to reverse, causing water to splash on two opposing sides of the splasher unit during one completed cycle. One having skill would recognize that any number of cycle configurations are possible with varying intensity, time, rest, and direction.

The splasher may provide additional effects in addition to or in lieu of a water effect. For example, the splasher may be configured to create a flash or strobe effect when in operation. The flash or strobe effect refers to a reflection of light off the rotating splasher at higher rates of rotation. In one or more embodiments, the splasher may be rotated between 100-900 rpm, above 200 rpm, above 300 rpm, above 400 rpm, above 500 rpm, above 600 rpm, above 700 rpm, above 800 rpm, between 300-800 rpm, between 350-750 rpm, between 700-800 rpm. When rotated at such speeds, light reflecting off the lighter markings of the splasher may create a flashing or strobe effect. The strobe effect may be in addition to or in lieu of the splashing or water effect caused by contact with the body of water. The splasher may be configured to operate at a higher rpm when the splasher contacts the water during operation to account for the drag caused by the contact. For example, in an operation where both a water effect (such as a splash) and a strobe effect are desired, the splasher may rotate at a rate above 300 rpm, above 400 rpm, above 500 rpm, above 600 rpm, above 700 rpm, and above 800 rpm. In alternate embodiments, the splasher may rotate at a rate between 725-775 rpm. For example, in an embodiment employing a three-way switch, one position may be off, a second position may to operate at a medium or normal speed, and a third position may cause the motor to spin the splasher at a more vigorous speed. In such an embodiment, the medium or normal speed may include spinning the splasher at a rate that does not cause the flash or strobe effect, and the more vigorous speed may include spinning the splasher at a rate that will cause the flash or strobe effect. In other embodiments, all positions that cause movement may cause the splasher to spin at a rate that causes the flash or strobe effect, while in others, the system may be configured not to provide the flash or strobe effect.

In another embodiment, the splasher unit can include a receiver that can allow the electric motor to be operated with a remote controller. In an embodiment, the receiver can be included in the housing unit. In an embodiment, the remote controller can include an electric programmable device that is capable of controlling the movement of the splasher by the user. In an embodiment, the remote controller can be stored in the battery housing. In an embodiment, the remote controller can include a rechargeable battery. In an embodiment, the rechargeable battery of the remote controller can be recharged by connecting to the power source 40. The connection between the power source 40 and the remote can by any means that allows for charging, including USB connectors, DIN connectors, barrel connectors, 6.35 mm connectors, 3.5 mm connectors, 2.5 mm connectors, RCA connectors, HDMI connectors, molex connectors, IEC connectors, JST connectors, and the like.

The splashing unit may be connected to a support member 60. The support member 60 may comprise a pole or post structure, a structural rod, a float, a buoy, a wire hang, a chord, or other structural supports. For example, in a marsh environment, the base may be a structural rod inserted into the ground, a floating structure, or another external support. In the depicted embodiment, the support member may be a pole that defines a length with two opposing ends, a bottom end 65 and a top end 66. The pole may have a cross section that is substantially circular in shape, but other shapes are envisioned (e.g., square, rectangular, or triangular). The support member may comprise a single pole member or multiple pole members 61 connected together. Pole members may permanently or removable attach to each other. In at least one embodiment, the support member may include multiple pole members 61 removably attachable to each. The use of multiple members may allow for a pole to be constructed of varying length to suit needs, to interchange parts, or to deconstruct the pole for storage. The connection 63 between pole members may be a mechanical connection, such as by a fastener. In at least one embodiment, one pole member may socket into an opening of another pole member. Such connection may further include a mechanical aspect which may include a latch or catch. The bottom of the pole may include a spaded or sharp base 62 to allow for easier insertion into the ground.

The splasher unit 1 may be positioned during operation such that the ends 31*a,b* of splasher 30 is capable of contacting the water. It may further be positioned such that substantially all (if not all) of the housing unit 10 is above the water surface. The splashing unit may be connected a support member 60, such as a pole, via a connector 70. The splashing unit may be permanently, semi-permanently, or removably attached to the support member. FIGS. 10-11, 13, and 15 show various angles of the connector components with and without the pole member for case of viewing. Connector 70 may include a number of means, including mechanical fasteners, external mounts of a combination thereof. The connector 70 may include one or more of a saddle, hand knob, star knob, 4-point knob, triangle knob, bolts, screws, clamps, and the like. As depicted, the connector 70 may include a top and bottom clamp member or bracket 73*a,b*, a connector plate 74, a connector bolt or rod 71, and a connector knob 72. The connector clamp members may form a clamp or grip around pole member 61. Connector bolt runs through the housing unit 10 as well as both clamp members. Connector knob 72 may be tightened, pushing the top clamp member towards the bottom clamp member, thereby increasing the grip upon the pole member. The connector knob may be any securing means known in the art, including a wing nut, bracket, nut, or screw. The depicted clamp members 73*a,b* are shaped to mount the unit to a circular pole and are provided for illustrative purposes. It is understood that alternative clamp members employing different shapes, and even entirely different connection means may be used to attach the unit to an external body or surface.

The embodiment depicted in FIGS. 1-6 may be externally mounted to a support member such as a pole. In an alternative embodiment, such as the embodiment in FIG. 15, the housing unit may be constructed around a pole member, such that the pole member extends into and through at least a portion of the housing unit. In such an embodiment, the motor may be positioned more closely to the pole member. The motor may be mounted, either directly or indirectly to the pole member, such as by a mounting plate, a saddle, or other adapter. The mount between the motor and either or both the housing unit or the pole member may include a dampener pad intermediate to help reduce the vibrational effect of the motor on the pole.

The splasher unit may be configured to cause a water effect. The water effect may include ripples in the water, splashing, and the movement of water droplets in the air. The splasher unit may be employed on its own or it may be employed in connection with one or more decoy devices. For example, looking at FIGS. 1, 16, and 17, the decoy apparatus may further comprise a decoy unit 100. The decoy unit 100 may resemble at least a portion of an animal. In the depicted embodiment, decoy unit 100 resembles an avian animal, particularly a waterfowl. Examples of suitable decoy units are more properly described in U.S. Pat. Nos. 6,508,028; 6,079,140; 7,536,823; 10,194,653; 10,932,462; and 11,246,307, and U.S. patent application Ser. No. 18/125,521 (US Pub. No. 20240315236A1) which are hereby incorporated by reference in their entirety.

The animal decoy can include a head section or an anterior section and a tail section or a posterior section. The animal decoy can include a body section. The head section can include the anterior shape of a bird. The head section can include a head, crown, bill, nape, back, neck, throat, wings, chest, and abdomen. The tail section can include the posterior shape of a bird. The tail section can include a tail, undertail covert, rump, legs, wing, flank, and back. The body section can include a mid-shape of a bird. The body section can include nape, back, neck, throat, wings, chest, abdomen, tail, undertail covert, rump, legs, wing, flank. The head section can include a front, a back, a top, a bottom, a right side, and a left side. The tail section can include a front, a back, a top, a bottom, a right side, and a left side. The head section and the tail section can be coupled together. Various fasteners and connection means may be used to hold the tail section and head section together. In various embodiments, the decoy head and body may be formed from a single structure, such as a roto-molded body.

Figure 16:
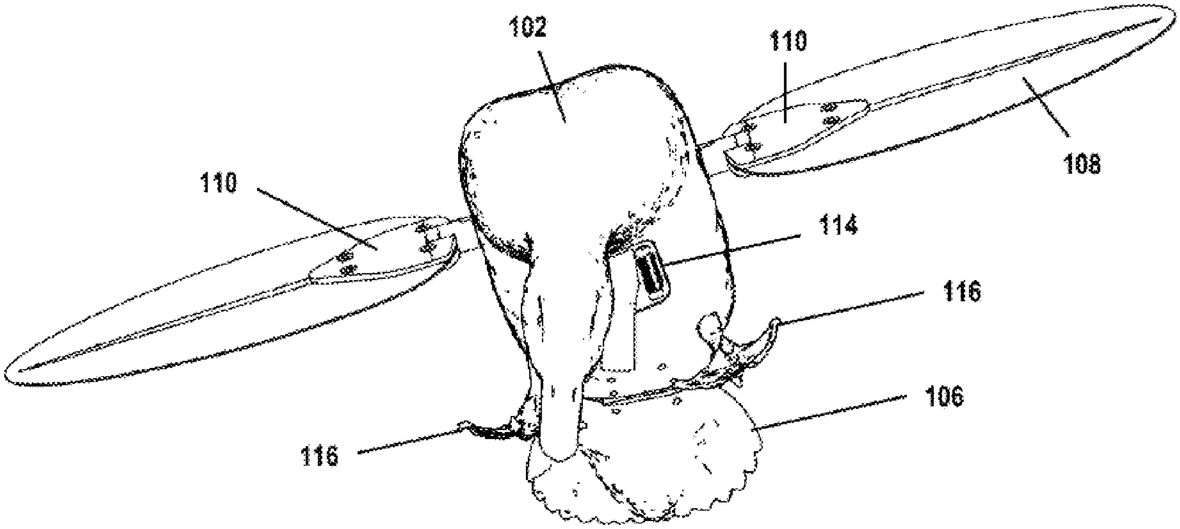
FIG. 16 depicts an illustrative embodiment of a decoy body that could be used in connection with the splasher decoy apparatus to add additional visual effect.
Figure 17:
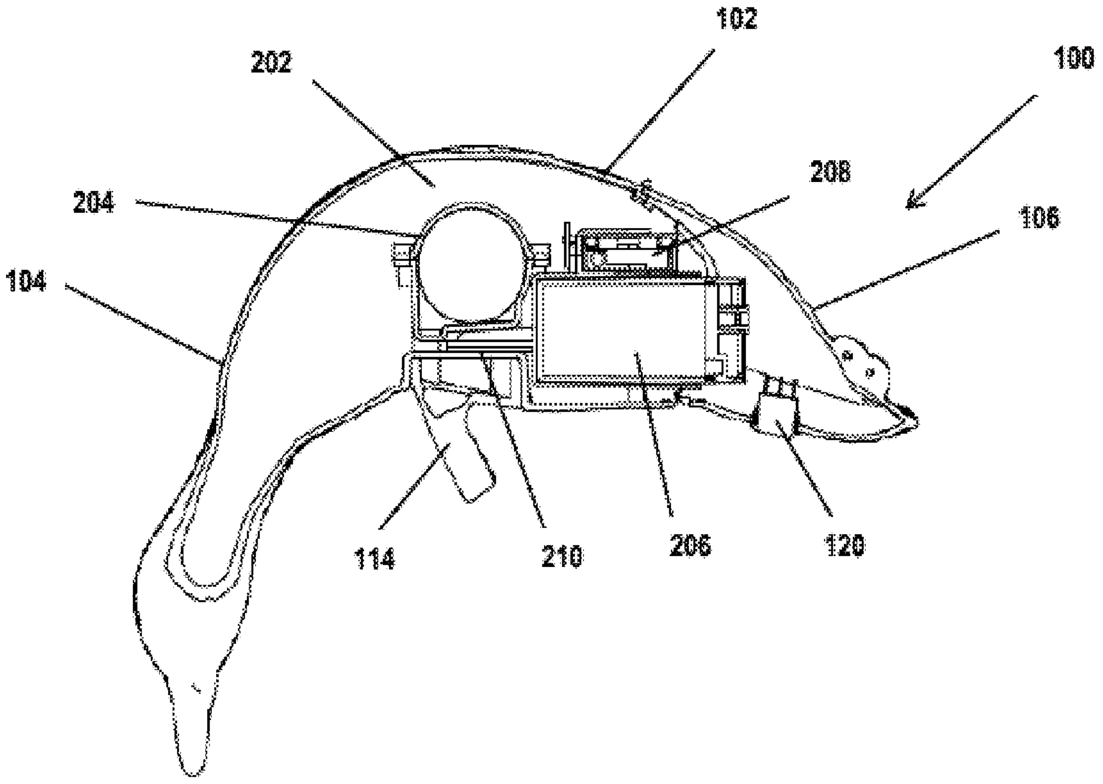
FIG. 17 is an isometric showing the interior mechanical components of the decoy in FIG. 16.

For example, FIG. 16 shows an embodiment of a mallard duck decoy 100 including a housing unit 102 made up of a head section 104 and a tail section 106. The mallard duck decoy 100 has two wing members 108 on opposing sides of the housing unit 102. The wing members 108 are attached to drive shaft (not shown) with a wing member attachment member 110 and a drive shaft adaptor. The housing unit 102 further includes a mounting member 114 (which connects to the pole member 61 at or near the top 65), feet members 116, a latch member 118, and a switch 120. FIG. 17 shows a cross sectional view of an embodiment of the animal decoy 100. The mallard duck decoy includes an interior space 202, an electric motor 204, a battery housing 206, a remote controller housing 208, and coupling member 210.

The decoy unit can include an electric motor 204 capable of moving the one or more members of the decoy unit to give the appearance of a moving animal. The one or more members can include wing members or paddles. For example, the motor 204 can be operatively connected to one or more wing members 108. The wing members 108 can be positioned on a left side and a right side of the animal decoy. The electric motor 204 can be configured to rotate the wing members 108 in the same direction or different directions. For example, the electric motor can cause the one or more wing members to produce flapping maneuvers. In other embodiments, the motor 204 may cause the wings to rotate, causing the impression of a flying duck. In an embodiment, the one or more members can be positioned at the head section or tail section of the animal decoy.

The decoy unit may include its own power source, controller mechanism, and electric motor for causing the movement of the one or more members of the decoy unit. The decoy unit and the splasher unit may share one or more of a common power source or control mechanism. The common components may be located substantially in the splasher unit housing unit 10, substantially in the animal body housing 102, or external to the housing unit and the animal body housing. The common component may be connected to the respective units via wiring. Such wiring may be run within or external to the support member 60, which may include a polc.

In use, the user may install the support member 60 in the body of water, such as a marsh, with the bottom end 65 in contact with the floor of the body of water. In the installed position, the top end of the support member may be located above the waterline. The user may then connect the splasher unit to the pole member using connector 70. The pole member may have an indicator 64 on it to direct the user where to install the splasher unit. This indicator may be a marking or a position for a connector piece, such as a hole or a mounting bracket. The splasher may have a waterline indicator to help direct the user as to the desired height for installation. The user may place the splasher in a mounting position. To obtain a suitable mounting position, the user may place the unit and splasher such that the splasher is substantially vertically and perpendicular to the surface of the water. The user may then maneuver the housing unit into position such that the water line falls at the desired indicator or within a specified zone according to the water line indicator 36, when the splasher is in a mounting position. The user may then secure the housing unit to the pole via the connector. The decoy unit may also be connected to the same support pole. In the depicted embodiment, the decoy apparatus is designed to mimic a landing waterfowl which is causing a splash. As such, the decoy unit may be positioned above the splasher along the same pole. It may alternatively be located on a different pole located in proximity to the splasher unit.

For the purpose of understanding the Decoy Apparatus, references are made in the text to exemplary embodiments of a Decoy Apparatus, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the Decoy Apparatus may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

The invention claimed is:

1. A decoy apparatus comprising:

a. a first housing, a motor, a power source, a splasher, and a support member, wherein said motor is housed within said housing, b. wherein said housing defines an exterior shell and an interior chamber, c. wherein at least said motor and said power source are substantially housed within said housing and said splasher is located external to said housing;

d. wherein said motor, power source, and splasher are communicatively coupled and configured such that the power source is capable of actuating the motor which in turn causes the splasher to rotate;

e. wherein when the decoy apparatus is deployed in a body of water, the splasher defines a length between two opposing ends and extends generally vertically with respect to a surface of the body of water and is positioned such that, during rotation, a first one of said opposing ends is in the body of water while a second one of said opposing ends is above the surface of the body of water, and as the splasher continues to rotate the opposing ends alternately move into and out of the body of water, causing water to splash when the splasher is acted upon by the motor; and f. wherein the splasher comprises a first pattern and a second pattern and wherein the first pattern is darker than the second pattern, and wherein the motor and the splasher are configured such that the motor causes the splasher to rotate at a rate sufficient for the first pattern and the second pattern to produce a strobe effect while causing water to splash.

2. The decoy apparatus of claim 1 further comprising a controller in operative communication with said motor, said controller capable of actuating the motor.

3. The decoy apparatus of claim 1 wherein the motor rotates the splasher at a rate between 1-100 rpm when actuated by the motor.

4. The decoy apparatus of claim 1 further comprising a structure that mimics the look of at least a portion of an avian animal.

5. The decoy apparatus of claim 4 further comprising a wing member in proximity to said structure.

6. The decoy apparatus of claim 4 wherein the structure houses a second motor, said second motor connected to at least one action member selected from a wing member, a foot member, or a paddle member.

7. The decoy apparatus of claim 6 wherein the second motor is operatively connected to at least one wing member, wherein said motor rotates said wing member at a speed of greater then 50 rpm.

8. The decoy apparatus of claim 2 wherein the controller further comprises a remote control in electronic communication with a receiver.

9. The decoy apparatus of claim 6 wherein the two motors are in electronic communication with the same power source.

10. The decoy apparatus of claim 1 further comprising a reverser, wherein when activated, the motor causes the splasher to spin in one direction and then the reverser causes the motor to spin the splasher in the opposing direction.

11. The decoy apparatus of claim 1 wherein the decoy apparatus is configured to produce a water effect and a strobe effect, wherein the motor and splasher are configured such that the motor causes the splasher to rotate at a rate of greater than 300 rpm.

12. The decoy apparatus of claim 11 wherein the motor and splasher are configured such that the motor causes the splasher to rotate at a rate of greater than 500 rpm.

13. The decoy apparatus of claim 7 wherein the decoy apparatus is configured to produce a water effect and a strobe effect, wherein both the splasher and the at least one wing member rotate at a rate of greater than 300 rpm, and wherein the first motor rotates the splasher at a rate equal to or greater than the rate that the second motor rotates the at least one wing member.

14. The decoy apparatus of claim 1, wherein less than one inch of the splasher enters the body of water when rotating.

15. The decoy apparatus of claim 1, wherein the motor is configured to selectively rotate the splasher at a first speed and at a higher, second speed, wherein rotation of the splasher at the first speed causes the splasher to splash water without causing said first pattern and said second pattern to produce a strobe effect, and wherein rotation of the splasher at the second speed causes the splasher to splash water and causes said first pattern and said second pattern to produce a strobe effect.

16. The decoy apparatus of claim 1, wherein the splasher is adjustably mounted to the support member.

17. The decoy apparatus of claim 16, wherein the splasher is removably coupled to the support member.

* * * * *